(12) United States Patent
Zou et al.

(10) Patent No.: US 11,126,202 B2
(45) Date of Patent: Sep. 21, 2021

(54) OBSTACLE-AVOIDANCE CONTROL METHOD FOR UNMANNED AERIAL VEHICLE (UAV), FLIGHT CONTROLLER AND UAV

(71) Applicant: SZ DJI TECHNOLOGY CO., LTD., Shenzhen (CN)

(72) Inventors: Yao Zou, Shenzhen (CN); Chunming Wang, Shenzhen (CN); Junxi Wang, Shenzhen (CN); Guang Yan, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 239 days.

(21) Appl. No.: 16/417,074

(22) Filed: May 20, 2019

(65) Prior Publication Data

US 2019/0271992 A1   Sep. 5, 2019

Related U.S. Application Data

(63) Continuation of application No. PCT/CN2016/106832, filed on Nov. 22, 2016.

(51) Int. Cl.
*G05D 1/04* (2006.01)
*G05D 1/10* (2006.01)
*G08G 5/00* (2006.01)
*G08G 5/04* (2006.01)

(52) U.S. Cl.
CPC .............. *G05D 1/042* (2013.01); *G05D 1/106* (2019.05); *G05D 1/1064* (2019.05); *G08G 5/0078* (2013.01); *G08G 5/045* (2013.01)

(58) Field of Classification Search
CPC ...... G05D 1/042; G05D 1/106; G05D 1/1064; G05D 1/101; G08G 5/0078; G08G 5/045
See application file for complete search history.

(56) References Cited

U.S. PATENT DOCUMENTS

| 2006/0058931 | A1  | 3/2006 | Ariyur et al. |
| 2012/0158280 | A1  | 6/2012 | Ravenscroft |
| 2016/0018822 | A1* | 1/2016 | Nevdahs ............. G05D 1/0094 701/26 |
| 2016/0039436 | A1* | 2/2016 | Bhagwatkar .......... B61L 23/00 348/148 |
| 2017/0025021 | A1* | 1/2017 | Song ..................... G08G 5/0013 |
| 2018/0275654 | A1* | 9/2018 | Merz .................... G08G 5/0086 |

FOREIGN PATENT DOCUMENTS

| CN | 102707724 A | 10/2012 |
| CN | 102749927 A | 10/2012 |
| CN | 103116360 A | 5/2013 |
| CN | 104820429 A | 8/2015 |
| CN | 105955298 A | 9/2016 |
| CN | 105955303 A | 9/2016 |

OTHER PUBLICATIONS

Norld Intellectual Property Organization (WIPO) International Search Report for PCT/CN2016/106832 dated Aug. 18, 2017 8 Pages.

* cited by examiner

*Primary Examiner* — Mary Cheung
(74) *Attorney, Agent, or Firm* — Anova Law Group, PLLC

(57) ABSTRACT

An obstacle-avoidance control method comprises acquiring a distance between an unmanned aerial vehicle (UAV) and a front object in a flying direction of the UAV; and controlling a flying altitude of the UAV according to the distance between the UAV and the front object.

18 Claims, 6 Drawing Sheets

Acquiring a distance between an UAV and a front object in a flying direction of the UAV — S101

Controlling a flying altitude of the UAV according to the acquired distance between the UAV and the front object — S102

OBSTACLE-AVOIDANCE CONTROL METHOD FOR UNMANNED AERIAL VEHICLE (UAV), FLIGHT CONTROLLER AND UAV

CROSS-REFERENCE TO RELATED APPLICATION

This application is a continuation application of International Application No. PCT/CN2016/106832, filed on Nov. 22, 2016, the entire contents of which are incorporated herein by reference.

TECHNICAL FIELD

The present disclosure relates to the field of unmanned aerial vehicles (UAV) and, more particularly, to an obstacle-avoidance control method for UAV, a flight controller, and an UAV thereof.

BACKGROUND

Currently, an unmanned aerial vehicles (UAV) is often equipped with a radar. The working altitude of agricultural plant protection UAVs is often below 4 meters and, moreover, due to complicated working environment in farms, an obstacle-avoidance radar becomes a necessary equipment for the agricultural plant protection UAVs.

However, agricultural plant protection UAVs sometimes work in hills, slopes, terraces and other environments. Due to the complexity of terrain such as hills, slopes and terraces, when the agricultural plant protection UAVs fly forward at the same altitude, the obstacles in front of the UAV detected by the radar may be high hills, slopes or ground of terraces. If the ground in front of the agricultural plant protection UAVs is used as an obstacle to trigger the obstacle-avoidance function of the UAVs, for example, stopping flying forward, the agricultural plant protection UAVs may not operate normally in the hills, slopes and terraces.

SUMMARY

In accordance with the disclosure, there is provided an obstacle-avoidance control method. The method comprises acquiring a distance between an unmanned aerial vehicle (UAV) and a front object in a flying direction of the UAV; and controlling a flying altitude of the UAV according to the distance between the UAV and the front object.

Also in accordance with the disclosure, there is provided an UAV. The UAV comprises a fuselage; a power system mounted at the fuselage and configured to provide flight power; and a flight controller in communication with the power system to control the UAV. The flight controller includes one or more processors which work individually or cooperatively. The one or more processors are configured to acquire a distance between the UAV and a front object in a flying direction of the UAV, and control a flying altitude of the UAV according to the acquired distance between the UAV and the front object.

DESCRIPTION OF MAIN COMPONENTS AND REFERENCE NUMERALS

| | |
|---|---|
| Flying direction | 1 |
| Flying direction before an adjustment | 2 |
| Flying direction after an adjustment | 3 |
| Obstacle | 22 |
| Current position | 30 |
| Flight track | 31 |
| UAV | 100 |
| Motor | 107 |
| Propeller | 106 |
| Electronic governor | 117 |
| Flight controller | 118 |
| Communication system | 110 |
| Supporting device | 102 |
| Imaging device | 104 |
| Ground station | 112 |
| Antenna | 114 |
| Electromagnetic wave | 116 |
| Obstacle-avoidance sensor | 211 |
| Altitude sensor | 212 |

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

As used herein, when a first component may be referred to as "fixed" to a second component, it may be intended that the first component may be directly mounted at the second component or may be indirectly mounted at the second component via a third component between them. When a first component may be referred to as "connecting/connected" to a second component, it may be intended that the first component may be directly connecting/connected to the second component or may be indirectly connecting/connected to the second component via a third component between them.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein may include any suitable combination of one or more related items listed.

Exemplary embodiments will be described with reference to the accompanying drawings. In the situation where the technical solutions described in the embodiments are not conflicting, they can be combined.

Figure 1:
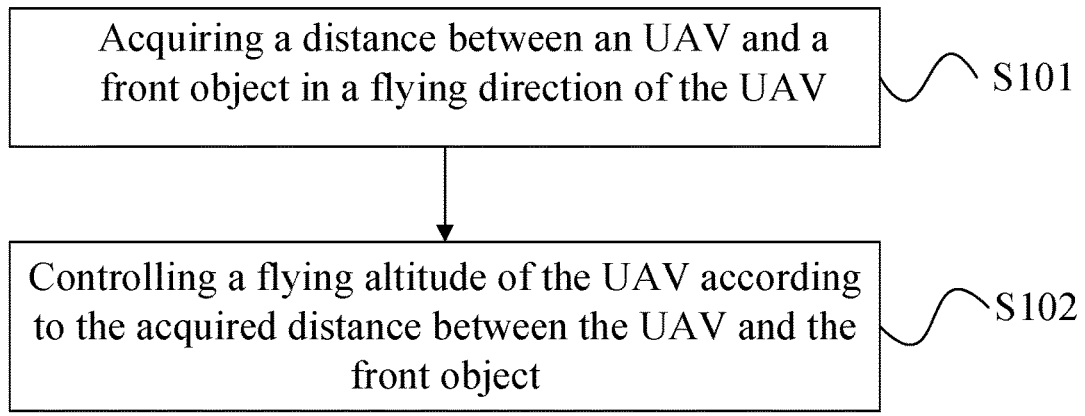
FIG. 1 is a flow chart of an obstacle-avoidance control method for unmanned aerial vehicle (UAV) according to an embodiment of the disclosure.

The present discourse provides an obstacle-avoidance control method for UAV. FIG. 1 is a flow chart of an obstacle-avoidance control method for UAV according to an embodiment of the disclosure. As shown in FIG. 1, the obstacle-avoidance control method for UAV may comprise the following steps.

A distance between the UAV and a front object in a flying direction of the UAV is acquired (S101). In the disclosed embodiments, the UAV may be equipped with a detecting device for detecting an object around the UAV. In particular, the detecting device may detect the altitude of the UAV from the ground, and the altitude and distance of the UAV from the ground in front of the UAV. In one embodiment, the detecting device may detect the distance between the UAV and a front object in the flying direction of the UAV.

Figure 2:
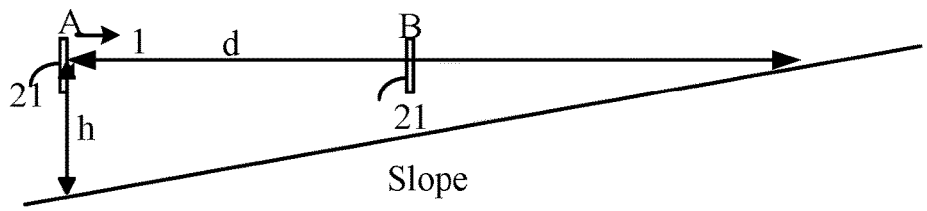
FIG. 2 is an application scenario of an obstacle-avoidance control method for UAV according to an embodiment of the disclosure.

FIGS. 2-6 are application scenarios of an obstacle-avoidance control method for UAV according to embodiments of the disclosure. As shown in FIG. 2, the ground below the UAV may be a slope, and the UAV may fly forward in a horizontal direction, as indicated by an arrow 1. The present disclosure does not limit the specific flying direction of the UAV. The detecting device 21 may detect that in the horizontal direction the distance between the ground in front of the detecting device and the detecting device is d, and in the vertical direction the altitude of the detecting device from the ground below is h. The distance d between the ground in front of the detecting device and the detecting device may represent the distance between the UAV and the front ground in the flying direction of the UAV, and in the vertical direction the altitude h of the detecting device from the ground below may represent the altitude of the UAV from the ground below.

The detecting device may include at least one of a radar sensor, an ultrasonic sensor, a time of flight (TOF) ranging sensor, a visual sensor, or a laser sensor.

In the disclosed embodiments, the execution body of the obstacle-avoidance control method may be a flight controller on the UAV, and the flight controller may acquire the distance between the front ground in the flying direction of the UAV and the UAV from the detecting device.

Returning to FIG. 1, after the distance between the UAV and the front object in the flying direction of the UAV is acquired, a flying altitude of the UAV is controlled according to the acquired distance between the UAV and the front object (S102).

Figure 3:
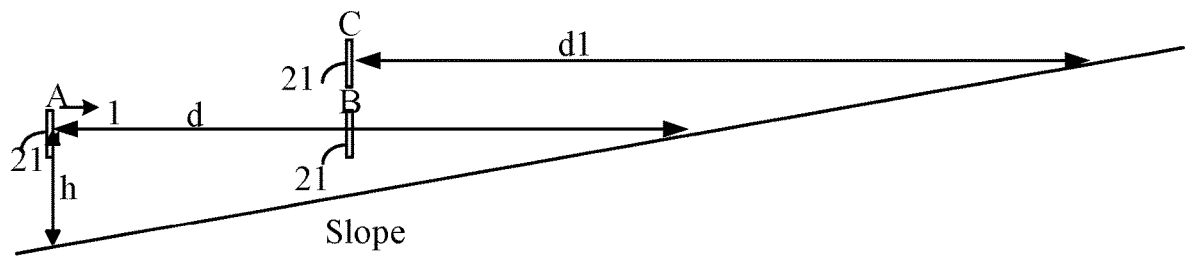
FIG. 3 is an application scenario of an obstacle-avoidance control method for UAV according to an embodiment of the disclosure.

As shown in FIG. 2, as the UAV flies forward, for example, the UAV flies from a position A to a position B, the distance d from the UAV to the front ground may be continuously reduced. When the distance d from UAV at the position B to the front ground is smaller than a preset first safety distance and greater than a preset second safety distance, the flying altitude of the UAV at the position B may be increased to reach a position C, as FIG. 3 shows. The first safety distance may be greater than the second safety distance.

As shown in FIG. 3, as the flying altitude of the UAV increases, the distance between the UAV and the front object may increase. The UAV may arrive at the position C after increasing the flying altitude at the position B, and the distance d1 from the UAV at the position C to the front ground may be larger than the distance from the UAV at the position B to the front ground. Moreover, the greater the altitude of the UAV is increased at the position B, i.e., the greater the altitude difference between the position C and the position B, the greater the distance d1 between the UAV and the front ground when the UAV arrives at the position C. In one embodiment, the flight controller may control the UAV to increase the flying altitude at the position B, to enable the distance d1 from the UAV at the position C to the front ground to be greater than or equal to the first safety distance.

Figure 4:
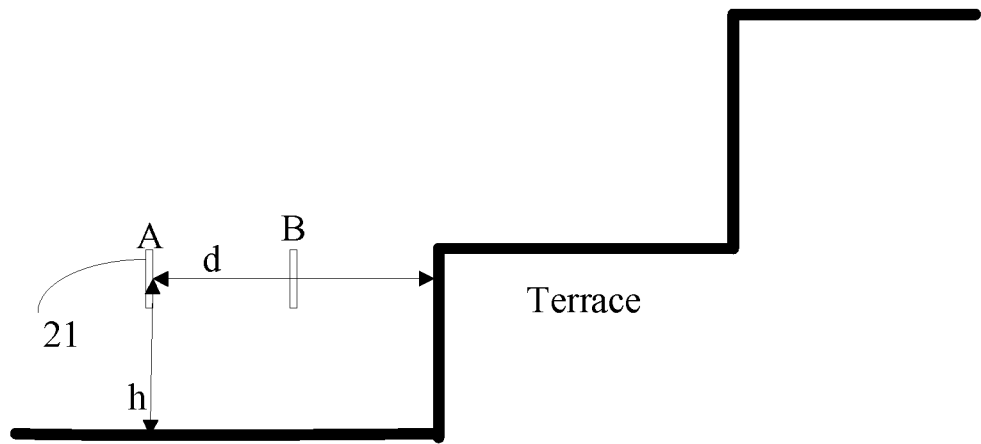
FIG. 4 is an application scenario of an obstacle-avoidance control method for UAV according to an embodiment of the disclosure.
Figure 5:
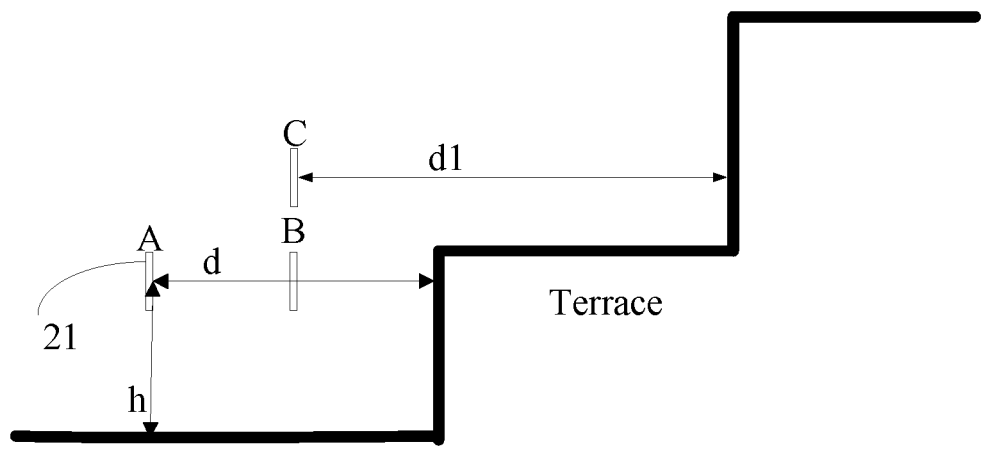
FIG. 5 is an application scenario of an obstacle-avoidance control method for UAV according to an embodiment of the disclosure.

As shown in FIG. 4, the ground below the UAV may be a terrace, and the UAV may fly forward in the horizontal direction indicated by the arrow 1. At the position A, the detecting device 21 may detect that in the horizontal direction the distance from the ground in front of the detecting device (i.e., the front ground) to the detection device is d, and in the vertical direction the altitude from the ground below to the detection device is h. As the UAV flies forward, for example, the UAV flies from a position A to a position B, the distance d from the UAV to the front ground may be continuously reduced. When the distance d from the UAV at the position B to the front ground is smaller than the preset first safety distance and greater than the preset second safety distance, the flying altitude of the UAV at the position B may be increased to reach a position C as FIG. 5 shows. The first safety distance may be greater than the second safety distance.

As shown in FIG. 5, as the flying altitude of the UAV increases, the distance between the UAV and the front object may also increase. The UAV may arrive at the position C after increasing the flying altitude at the position B, and the distance d1 from the UAV at the position C to the front ground may be larger than the distance from the UAV at the position B to the front ground. Moreover, the greater the altitude of the UAV is increased at the position B, i.e., the greater the altitude difference between the position C and the position B, the greater the distance d1 between the UAV and the front ground when the UAV arrives at the position C. In one embodiment, the flight controller may control the UAV to increase the flying altitude at the position B, to enable the distance d1 from the UAV at the position C to the front ground to be greater than or equal to the first safety distance.

In the disclosed embodiments, the UAV may be an agricultural UAV.

In the disclosed embodiments, the flying altitude of the UAV may be controlled based on the distance between the UAV and the front object. As the flying altitude of the UAV increases, the distance between the UAV and the front object may increase. When the UAV flies forward, and the distance between the UAV and the front object is smaller than a safety distance, the flying altitude of the UAV may be increased, such that the agricultural UAV may be able to increase the flying altitude along with the terrain when operated in hills, slopes, terraces, etc. Accordingly, the normal operation of the agricultural UAV may be ensured.

Figure 6:
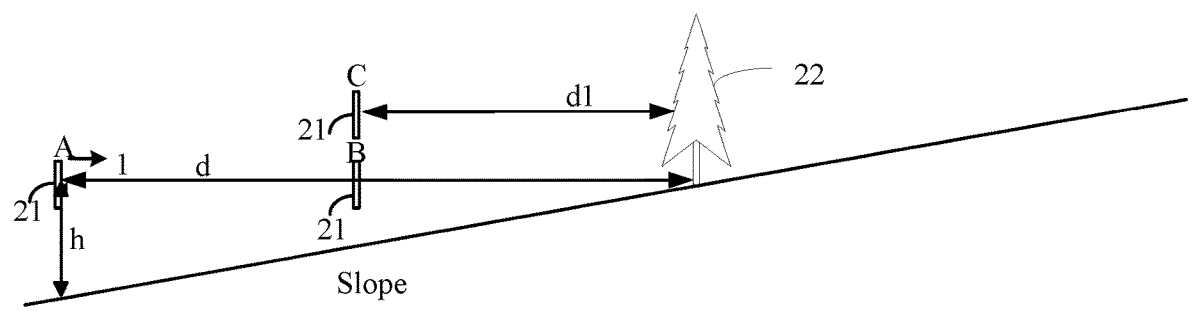
FIG. 6 is an application scenario of an obstacle-avoidance control method for UAV according to an embodiment of the disclosure.

The present disclosure provides an obstacle-avoidance control method for UAV. In one embodiment, as shown in FIG. 1, when the distance between the UAV and the front object is smaller than the second safety distance, the flight trajectory of the UAV may be adjusted, or the UAV may be controlled to stop flying in the flying direction. In one embodiment, as shown in FIG. 2, when the distance between the UAV at the position A or the position B and the front ground is smaller than the second safety distance, the flight controller may adjust the flight trajectory of the UAV or control the UAV to stop flying in the flying direction. In one embodiment, as shown in FIG. 3 and FIG. 6, obstacles such as trees, iron towers, etc. are located in the front ground in the flying direction of the UAV, and the altitude of such obstacles is often greater than 8 meters. For illustrative purposes, FIG. 6 illustrates a tree as the obstacle 22. At the position B, the distance d between the UAV and the obstacle 22 may be smaller than a preset first safety distance and greater than a preset second safety distance, then the flying altitude of the UAV at the position B may be increased to reach the position C as shown in FIG. 6. The distance d1 between the UAV at the position C and the obstacle 22 may be smaller than the distance between the UAV at the position B and the front ground. When d1 is smaller than the second safety distance, the flight trajectory of the UAV may be adjusted, or the UAV may be controlled to stop flying in the flying direction.

Figure 7:
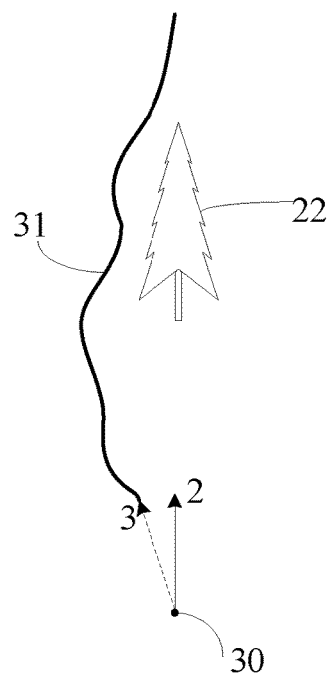
FIG. 7 is a schematic diagram of adjusting a flying direction according to an embodiment of the disclosure.

The flight controller may adjust the flight trajectory of the UAV in various ways. In one embodiment, the flight controller may adjust the flight trajectory of the UAV by adjusting a heading angle of the UAV, such that the flight trajectory of the UAV may be configured to bypasses the front object. FIG. 7 is a schematic diagram of adjusting a flying direction according to an embodiment of the disclosure. As shown in FIG. 7, the reference number 30 represents a current position of the UAV, and the arrow 2 represents a current flying direction of the UAV. When the distance d1 between the current position 30 and the front obstacle 22 is smaller than the second safety distance, the heading angle of the UAV may be adjusted. For example, the heading angle of the UAV may be adjusted to deviate from the current flying direction, such that the UAV may fly in the direction indicated by the arrow 3 and, accordingly, a flight trajectory 31 of the UAV may bypass the obstacle 22.

Figure 8:
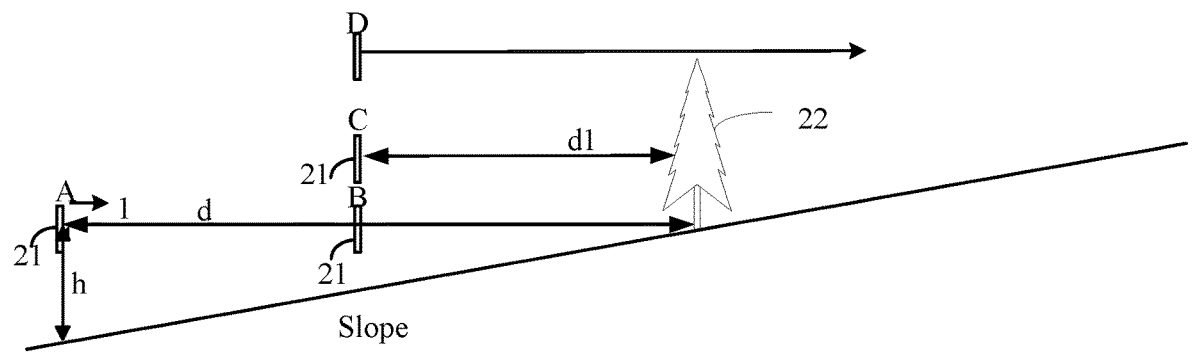
FIG. 8 is an application scenario of an obstacle-avoidance control method for UAV according to an embodiment of the disclosure.

In another embodiment, the flight controller may adjust the flight trajectory of the UAV by continuously increasing the altitude of the UAV, such that the flight trajectory of the UAV may pass over the front object. FIG. 8 is an application scenario of an obstacle-avoidance control method for UAV according to an embodiment of the disclosure. As shown in FIG. 8 and FIG. 7, the altitude of the UAV at the position C may be continuously increased to reach a position D. At the position D, the detecting direction of the detecting device 21 may be no longer affected by the obstacle 22. That is, after increasing the altitude of the UAV at the position C, the obstacle 22 is desired to be no longer in the detecting direction of the detecting device 21. As the UAV continues flying forward from the position D, the flight trajectory of the UAV may pass over the obstacle 22.

As shown in FIG. 8, the UAV rises from the position B to the position C and from the position C to the position D, during which the flying direction of the UAV may remain in a direction indicated by the arrow 1 without any change. That is, when the flight controller is increasing the flying altitude of the UAV, the flight controller may control the UAV to continue flying in the flying direction at the same time.

In certain embodiments, the flight controller may control the UAV to stop flying in the flying direction when increasing the flying altitude of the UAV. For example, at the position B or the position C, the flight controller may control the UAV to stop flying in the flying direction, for example, control the UAV to be in a hovering state.

Figure 9:
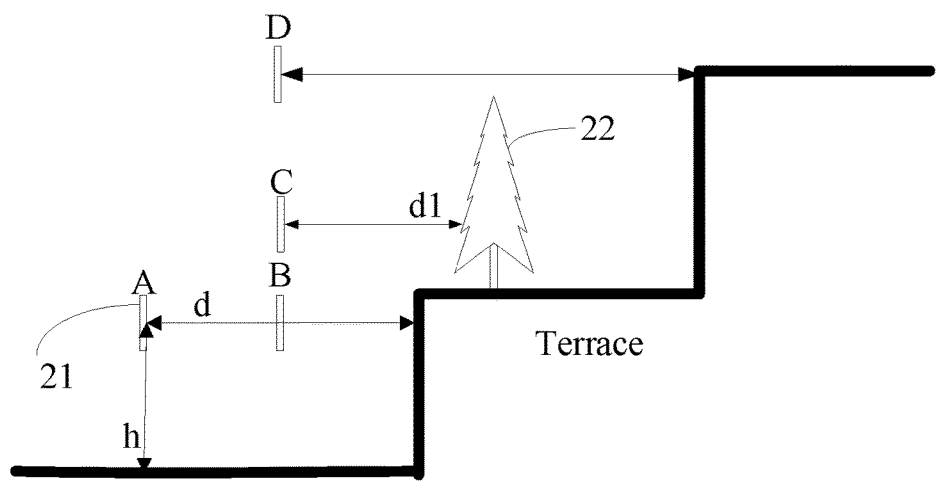
FIG. 9 is an application scenario of an obstacle-avoidance control method for UAV according to an embodiment of the disclosure.

FIG. 9 is an application scenario of an obstacle-avoidance control method for UAV according to an embodiment of the disclosure. As shown in FIG. 9, the ground below the UAV may be a terrace. Referring to FIG. 9 and FIG. 5, provided that an obstacle 22 such as a tree is in front of the flying direction of the UAV, after the UAV is increased to the position C where the distance d1 between the UAV and the obstacle 22 is smaller than the second safety distance, the flight controller may control the UAV to hover at the position C. In one embodiment, the flight controller may also adjust the heading angle of the UAV, as shown in FIG. 7. In another embodiment, the flight controller may continuously increase the flying altitude of the UAV to reach the position D, such that the obstacle 22 is no longer in the detecting direction of the detecting device 21.

In the disclosed embodiments, when the distance between the UAV and the front object is smaller than the second safety distance, the UAV may be prevented from colliding with the front objects through adjusting the flight trajectory of the UAV or controlling the UAV to stop flying in the original flight direction. Thus, the safety of UAVs in flight may be improved, especially when the UAVs are flying at low altitudes.

The present disclosure further provide a flight controller. The flight controller may include one or more processors, which work individually or cooperatively. The processor may be configured to acquire a distance between an UAV and a front object in a flying direction of the UAV, and control a flying altitude of the UAV according to the acquired distance between the UAV and the front object.

When the processor is configured to control the flying altitude of the UAV according to the acquired distance between the UAV and the front object, the processor may determine whether the distance between the UAV and the front object is smaller than a preset first safety distance and greater than a preset second safety distance. In response to determine that the distance between the UAV and the front object is smaller than the preset first safety distance and greater than the preset second safety distance, the process may control the UAV to increase the flying altitude, thereby increasing the distance between the UAV and the front object. The first safety distance may be greater than the second safety distance.

As the flying altitude of the UAV increases, the distance between the UAV and the front object may also increase, which enables the distance between the UAV and the front object to be greater than or equal to the first safety distance.

The principles and implementations of the flight controller are similar to the embodiment shown in FIG. 1 and will not be further described herein.

In the disclosed embodiments, the flying altitude of the UAV may be controlled based on the distance between the UAV and the front object. As the flying altitude of the UAV increases, the distance between the UAV and the front object may increase. When the UAV flies forward and the distance between the UAV and the front object is smaller than a safety distance, the flying altitude of the UAV may be increased, such that the agricultural UAV may be able to increase the flying altitude along with the terrain when operated in hills, slopes, terraces, etc. Accordingly, the normal operation of the agricultural UAV may be ensured.

The present disclosure further provides a flight controller. In particular, when the distance between the UAV and the front object is smaller than the second safety distance, the processor may adjust the flight trajectory of the UAV or control the UAV to stop flying in the flying direction. In one embodiment, the processor may control the UAV to increase the flying altitude and to continue flying in the original flight direction at the same time. In another embodiment, the processor may control the UAV to increase the flying altitude and, meanwhile, control the UAV to stop flying in the original flight direction.

The processor may adjust the flight trajectory of the UAV in various ways. In one embodiment, the processor may adjust the flight trajectory of the UAV by adjusting a heading angle of the UAV, such that the flight trajectory of the UAV may be allowed to bypass the front object. In another embodiment, the processor may adjust the flight trajectory of the UAV by continuously increasing the altitude of the UAV, such that the flight trajectory of the UAV may pass over the front object.

In certain embodiments, when the processor controls the UAV to stop flying in the flying direction as increasing the flying altitude of the UAV, the processor may control the UAV to be in a hovering state.

In addition, when the processor acquires the distance between the UAV and the front object in the flying direction of the UAV, the processor may be configured to detect the distance between the UAV and the front object in the flying direction of the UAV via a detecting device carried by the UAV. The detecting device may include at least one of a radar sensor, an ultrasonic sensor, a TOF ranging sensor, a visual sensor, or a laser sensor.

The principles and implementation manners of the flight controller are similar to the embodiment shown in FIG. 2, and details are not described herein again.

In the disclosed embodiments, when the distance between the UAV and the front object is smaller than the second safety distance, the UAV may be prevented from colliding with the front objects through adjusting the flight trajectory of the UAV or controlling the UAV to stop flying in the original flight direction. Thus, the safety of UAVs in flight may be improved, especially when the UAVs are flying at low altitudes.

Figure 10:
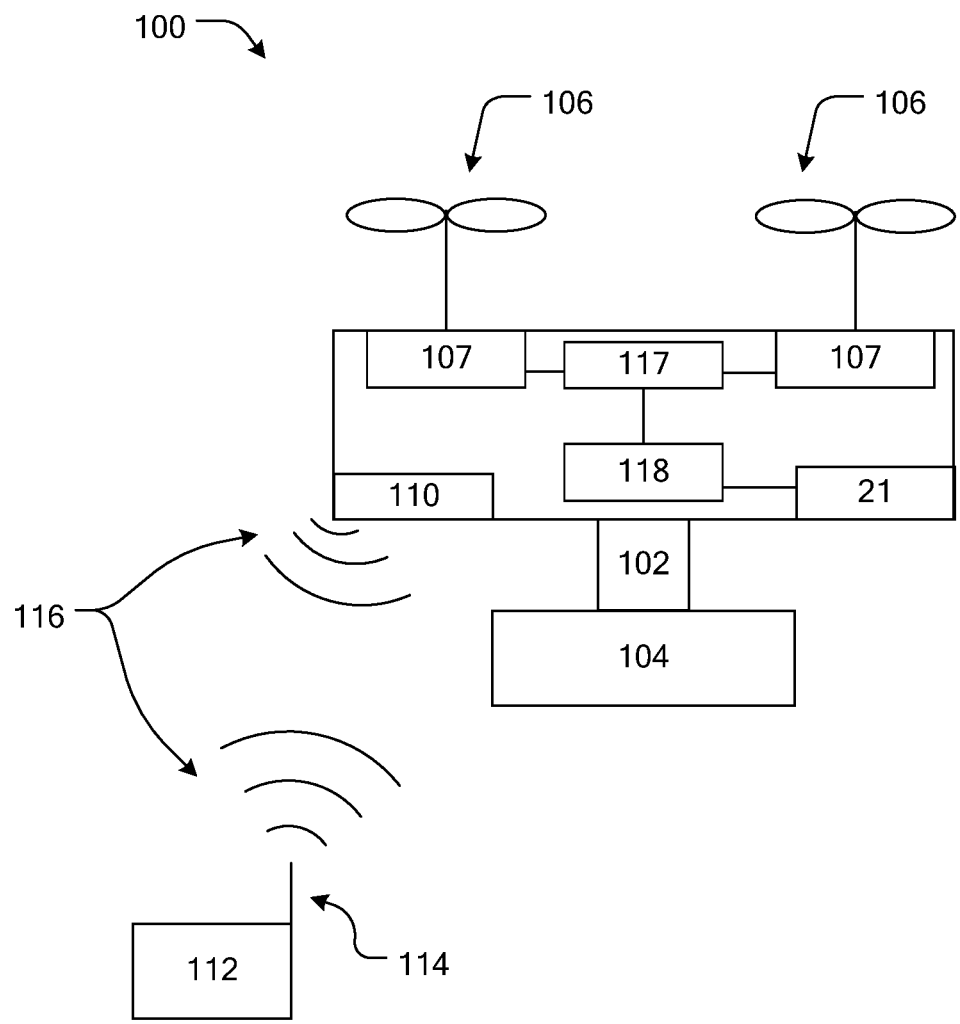
FIG. 10 is a structural diagram of an UAV according to an embodiment of the disclosure.

The present disclosure further provides an UAV. FIG. 10 is a structural diagram of an UAV according to an embodiment of the disclosure. As shown in FIG. 10, the UAV 100 may include a fuselage, a power system, a detecting device 21, and a flight controller 118. In particular, the power system may include at least one of a motor 107, a propeller 106 or an electronic governor 117. The power system may be mounted at the fuselage for providing flight power. The detecting device 21 may be mounted at the fuselage, and coupled to the flight controller 118 via a communication connection. That is, the detecting device 21 may be in communication with the flight controller 118. The detecting device 21 may detect objects around the UAV and, more particular, detect the distance between the UAV and the front object in the flying direction of the UAV, and the vertical distance between the ground below the detecting device 21 and the detecting device 21. In addition, the detecting device 21 may transmit the detected distance to the processor, such as the distance between the UAV and the front object in the flying direction of the UAV, the vertical distance between the ground below the detecting device 21 and the detecting device 21, etc.

The flight controller 118 may be in communication with the power system to control the UAV. In particular, the flight controller 118 may include an inertial measurement unit (IMU) and a gyroscope. The IMU and the gyroscope may be configured to detect, for example, an acceleration, a pitch angle, a roll angle, and a yaw angle of the UAV.

In addition, as shown in FIG. 10, the UAV 100 may further include a communication system 110, a supporting device 102, and an imaging device 104. The supporting device 102 may include a tripod head, and the communication system 110 may include a receiver configured to receive wireless signals transmitted by the antenna 114 at a ground station 112. The reference number 116 represents the electromagnetic wave generated in the communication between the receiver and the antenna 114.

The principles and implementation manners of the disclosed flight controller are similar to the foregoing embodiments, and are not described herein again.

In the disclosed embodiments, the flying altitude of the UAV may be controlled based on the distance between the UAV and the front object. As the flying altitude of the UAV increases, the distance between the UAV and the front object may increase. When the UAV flies forward and the distance between the UAV and the front object is smaller than a safety distance, the flying altitude of the UAV may be increased, such that the agricultural UAV may be able to increase the flying altitude along with the terrain when operated in hills, slopes, terraces, etc. Accordingly, the normal operation of the agricultural UAV may be ensured.

Figure 11:
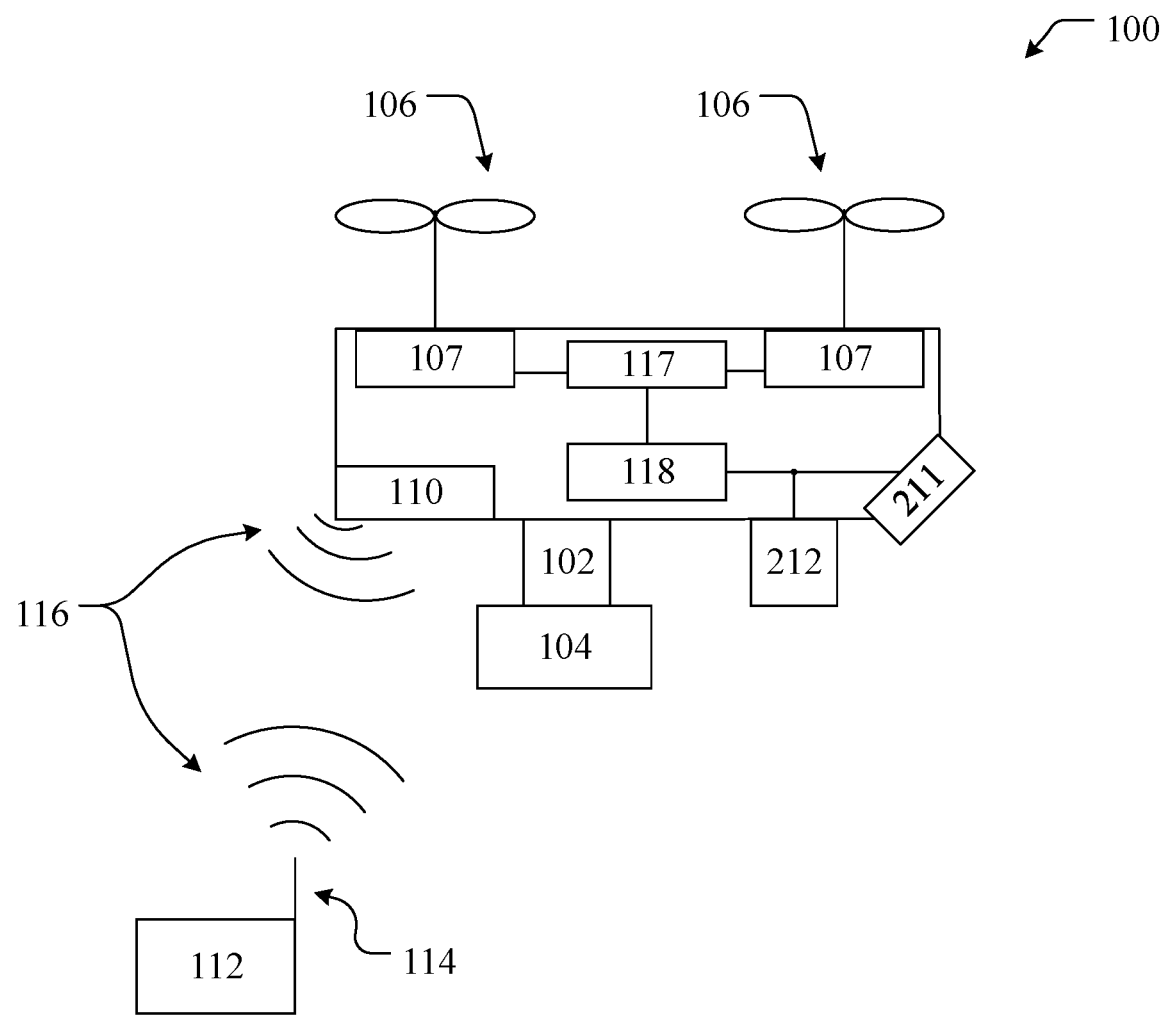
FIG. 11 is a structural diagram of an UAV according to an embodiment of the disclosure.

The present disclosure further provides an UAV. FIG. 11 is a structural diagram of an UAV according to an embodiment of the disclosure. The similarities between FIG. 10 and FIG. 11 are not repeated while certain difference may be explained.

As shown in FIG. 11, the detecting device 21 may include an obstacle-avoidance sensor 211 and an altitude sensor 212. The obstacle-avoidance sensor 211 may be in communication with the flight controller 118 to sense a distance between the UAV and the front object. The altitude sensor 212 may be in communication with the flight controller 118 to sense the relative altitude of the UAV from the ground.

The principles and implementation manners of the flight controller are similar to the foregoing embodiments, and are not described herein again.

In the disclosed embodiments, the distance between the UAV and the front object may be detected by the obstacle-avoidance sensor, and the relative altitude of the UAV from the ground may be detected by the altitude sensor, such that the detection accuracy may be improved as compared to detecting the distance between the UAV and the front object as well as the relative altitude of the UAV from the ground by a same detecting device.

In the several embodiments provided in the present disclosure, it should be understood that the disclosed system, apparatus, and method may be implemented in other manners. For example, the described apparatus embodiment may be merely exemplary. For example, the unit division may be merely a logical function division and there may be other divisions in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on multiple network units. A part or all of the units may be selected according to an actual need to achieve the objectives of the solutions in the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit may be implemented in a form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in a form of a software product. The computer software product may be stored in a storage medium and may include several instructions for instructing a computer device (which may be a personal computer, a server, or a network device) to perform all or a part of the steps of the methods described in the embodiments of the present disclosure. The foregoing storage medium may include any medium that can store program code, such as a universal serial bus (USB) flash drive, a removable hard disk, a read-only memory (ROM), a random-access memory (RAM), a magnetic disk, or an optical disc.

The foregoing descriptions are merely specific implementations of the present disclosure, but are not intended to limit the scope of the present disclosure. Any equivalent variation or replacement readily figured out by a person skilled in the art within the technical scope disclosed in the present disclosure shall fall within the scope of the present disclosure.

What is claimed is:

1. An obstacle-avoidance control method comprising:
   acquiring a distance between an unmanned aerial vehicle (UAV) and a front object in a flying direction of the UAV; and
   controlling a flying altitude of the UAV according to the distance between the UAV and the front object, including:
      in response to determining that the distance between the UAV and the front object is smaller than a preset first safety distance and greater than a preset second safety distance, increasing the flying altitude of the UAV, wherein the first safety distance is greater than the second safety distance.

2. The method of claim 1, wherein increasing the flying altitude of the UAV includes:
   increasing the flying altitude of the UAV to increase the distance between the UAV and the front object to be greater than or equal to the first safety distance.

3. The method of claim 1, wherein controlling the flying altitude of the UAV according to the distance between the UAV and the front object further includes:
   in response to determining that the distance between the UAV and the front object is smaller than the second safety distance, adjusting a flight trajectory of the UAV or controlling the UAV to stop flying in the flying direction.

4. The method of claim 3, wherein adjusting the flight trajectory of the UAV comprises one of the following:
   adjusting a heading angle of the UAV to enable the flight trajectory of the UAV to bypass the front object; and
   increasing the flying altitude of the UAV to enable the flight trajectory of the UAV to pass over the front object.

5. The method of claim 3, wherein controlling the UAV to stop flying in the flying direction comprises:
   controlling the UAV to be in a hovering state.

6. The method of claim 1, wherein controlling the flying altitude of the UAV according to the distance between the UAV and the front object further includes one of the following:
   simultaneously increasing the flying altitude of the UAV and controlling the UAV to continue flying in the flying direction; and
   increasing the flying altitude of the UAV and controlling the UAV to stop flying in the flying direction.

7. The method of claim 6, wherein controlling the UAV to stop flying in the flying direction comprises:
   controlling the UAV to be in a hovering state.

8. The method of claim 1, wherein acquiring the distance between the UAV and the front object in the flying direction of the UAV comprises:
   acquiring the distance between the UAV and the front object in the flying direction of the UAV via a detecting device carried by the UAV.

9. The method of claim 8, wherein:
   the detecting device includes at least one of a radar sensor, an ultrasonic sensor, a time of flight (TOF) ranging sensor, a visual sensor, or a laser sensor.

10. An unmanned aerial vehicle (UAV) comprising:
    a fuselage;
    a power system mounted at the fuselage and configured to provide flight power; and
    a flight controller in communication with the power system to control the UAV, including one or more processors configured to, individually or cooperatively, execute instructions to:
       acquire a distance between the UAV and a front object in a flying direction of the UAV; and
       control a flying altitude of the UAV according to the acquired distance between the UAV and the front object, including:
          determining whether the distance between the UAV and the front object is smaller than a preset first safety distance and greater than a preset second safety distance, and
          in response to determining that the distance between the UAV and the front object is smaller than the preset first safety distance and greater than the preset second safety distance, increasing the flying altitude of the UAV to increase the distance between the UAV and the front object,
          wherein the first safety distance is greater than the second safety distance.

11. The UAV of claim 10, wherein the one or more processors are further configured to execute the instructions to increase the flying altitude of the UAV to increase the distance between the UAV and the front object by:
    increasing the flying altitude of the UAV to increase the distance between the UAV and the front object to be greater than or equal to the first safety distance.

12. The UAV of claim 10, wherein the one or more processors are further configured to execute the instructions to control the flying altitude of the UAV according to the acquired distance between the UAV and the front object by:
    in response to determining that the distance between the UAV and the front object is smaller than the second safety distance, adjusting a flight trajectory of the UAV or controlling the UAV to stop flying in the flying direction.

13. The UAV of claim 12, wherein the one or more processors are further configured to execute the instructions to control the UAV to stop flying in the flying direction by:
controlling the UAV to be in a hovering state.

14. The UAV of claim 10, wherein the one or more processors are further configured to execute the instructions to control the flying altitude of the UAV according to the acquired distance between the UAV and the front object by performing one of the following:
simultaneously increasing the flying altitude of the UAV and control the UAV to continue flying in the flying direction; and
increasing the flying altitude of the UAV and control the UAV to stop flying in the flying direction.

15. The UAV of claim 14, wherein the one or more processors are further configured to execute the instructions to adjust the flight trajectory of the UAV by performing one of the following:
adjusting a heading angle of the UAV to enable the flight trajectory of the UAV to bypass the front object; and
increasing the flying altitude of the UAV to enable the flight trajectory of the UAV to pass over the front object.

16. The UAV of claim 14, wherein the one or more processors are further configured to execute the instructions to control the UAV to stop flying in the flying direction by:
controlling the UAV to be in a hovering state.

17. The UAV of claim 10, further comprising:
a detecting device mounted at the fuselage and communicating with the flight controller,
wherein the detecting device is configured to:
detect the distance between the UAV and the front object in the flying direction of the UAV, and
transmit the distance between the UAV and the front object in the flying direction of the UAV to the one or more processors.

18. The UAV of claim 17, wherein:
the detecting device includes at least one of a radar sensor, an ultrasonic sensor, a time of flight (TOF) ranging sensor, a visual sensor, or a laser sensor.

\* \* \* \* \*